D. H. WILSON.
ELECTRIC GRAVITY BATTERY.
APPLICATION FILED MAR. 25, 1915.

1,289,030.

Patented Dec. 24, 1918.

Witnesses

Inventor:
David H. Wilson.
by Parker & Barty
his Attys.

UNITED STATES PATENT OFFICE.

DAVID H. WILSON, OF NEW YORK, N. Y.

ELECTRIC GRAVITY-BATTERY.

1,289,030.  Specification of Letters Patent.  Patented Dec. 24, 1918.

Application filed March 25, 1915.  Serial No. 16,914.

*To all whom it may concern:*

Be it known that I, DAVID H. WILSON, a citizen of the United States, residing at New York city, in the county of New York and State of New York, have invented a certain new and useful Improvement in Electric Gravity-Batteries, of which the following is a specification.

This invention relates to electric batteries of the gravity type and has for its object to provide a new and improved device of this description. The invention is illustrated in the accompanying drawings, wherein—

Like numerals refer to like parts throughout the several figures.

Figure 1:
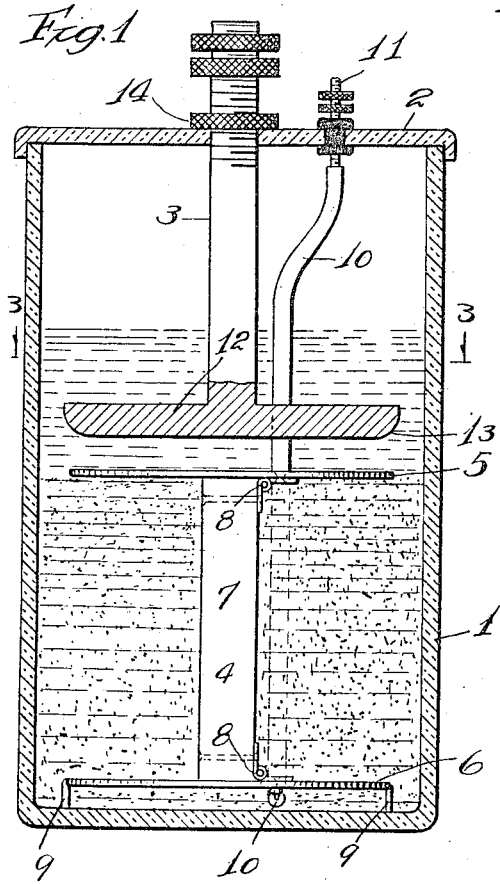
Figure 1 is a sectional view through a battery embodying my invention.
Figure 2:
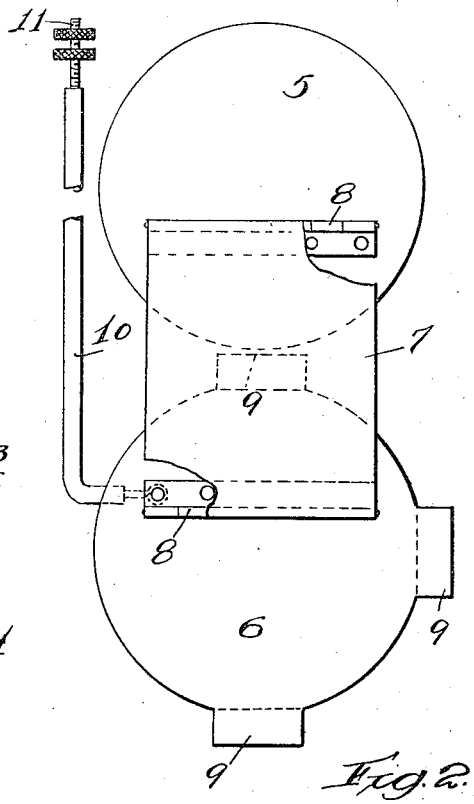
Fig. 2 is a view of the copper electrode when folded ready for shipment.
Figure 3:
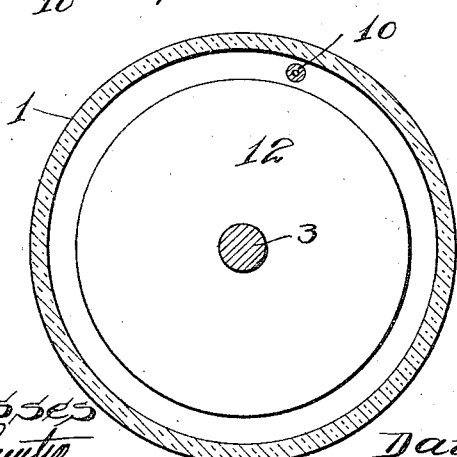
Fig. 3 is a sectional view taken on line 3—3 of Fig. 1.

As illustrated in the drawing, the battery consists of a receptacle 1 with a suitable cover 2, said battery provided with a zinc electrode 3 and a copper electrode 4. The copper electrode consists of an upper plate or disk 5 and a lower plate or disk 6 joined together by a broad strip 7, the plates or disks 5 and 6 and the strip 7 being made of copper. The plates 5 and 6 are attached to the strip 7 in any desired manner. I prefer, however, to provide a hinge connection 8 between the strip 7 and the plates 5 and 6. When in use the plates are substantially at right angles to the strip as shown in Fig. 1. When the electrode is being shipped the disks may be folded on their hinges so as to be substantially parallel to the strip 7, thereby economizing space and preventing breakage. The upper disk 5 may also be folded on its hinge to a vertical position when the electrode is in the receptacle, so that the battery may be easily filled. The lower plate 6 is preferably provided with a plurality of feet 9. These feet are preferably formed integral with the plate 6 and bent at an angle thereto so as to rest upon the bottom of the receptacle 1 to raise the plate 6 somewhat from the bottom of the jar. An insulated conductor 10 is connected with the copper electrode 4 and extends up to the top of the jar, the upper end 11 projecting through the cover so that the circuit wire may be connected thereto. The zinc electrode is provided with a plate 12, and this plate is opposed to the plate 5 of the copper electrode. The plate 12 is a solid plate, as shown in Fig. 3, there being no openings whatever through it, but the lower edge 13 is beveled so as to permit the easy escape of the bubbles of hydrogen gas. The plates 12, 5 and 6 practically extend entirely across the receptacle, filling substantially all the space from side to side. Some means is provided for adjusting the two electrodes with relation to each other. As herein shown, the zinc electrode 3 has its upper end threaded and there is a threaded part 14 which engages the cover 2. It will be seen that by moving this threaded part the zinc electrode may be moved up or down to vary the distance between the disk 12 and the disk 5 so as to regulate and vary the output of voltage and current.

I have found that by means of electrodes constructed as herein shown, the internal resistance of the battery is decreased, and I am able to secure a larger output of current with the same weight of zinc and copper.

The receptacle is filled with some suitable electrolyte such as copper sulfate.

I claim:

An electric gravity battery, comprising a receptacle, a covering therefor, a zinc electrode, a copper electrode, said copper electrode consisting of two separated copper plates, a copper strip connecting them, a hinge connected with each copper plate and having a portion which is connected to the side of the said copper strip, said copper plates normally engaging the opposite ends of said copper strip but free therefrom and being substantially parallel to each other so as to inclose and confine the material between them and retard its mingling with the material above the upper copper plate, said copper plates adapted to be moved about said hinges so as to be substantially parallel with the sides of said copper strip with their edges opposed, a zinc electrode having a plate opposed to one of said copper plates, means for adjusting said zinc electrode to and from one of said copper plates.

In testimony whereof, I affix my signature in the presence of two witnesses this 24th day of March, 1915.

DAVID H. WILSON.

Witnesses:
ARTHUR M. LOVILAND,
THEODORE M. CRISP.

Copies of this patent may be obtained for five cents each, by addressing the "Commissioner of Patents, Washington, D. C."